(12) United States Patent
Casarrubias et al.

(10) Patent No.: US 11,135,817 B2
(45) Date of Patent: Oct. 5, 2021

(54) COATED FILMS AND ARTICLES FORMED FROM SAME

(71) Applicants: Dow Global Technologies LLC, Midland, MI (US); Rohm and Haas Company, Collegeville, PA (US); Dow Quimica Mexicana S.A.de C.V., Mexico City (MX)

(72) Inventors: Juan Carlos Casarrubias, Mexico City (MX); Claudia Hernandez, Freeport, TX (US); Zair Dominguez Trinidad, Xalapa (MX); Jie Wu, Lake Jackson, TX (US)

(73) Assignees: Dow Global Technologies LLC, Midland, MI (US); Rohm and Haas Company, Collegeville, PA (US); Dow Quimica Mexicana S.A.de C.V., Mexico City (MX)

( * ) Notice: Subject to any disclaimer, the term of this patent is extended or adjusted under 35 U.S.C. 154(b) by 383 days.

(21) Appl. No.: 16/332,999

(22) PCT Filed: Sep. 27, 2017

(86) PCT No.: PCT/US2017/053637
§ 371 (c)(1),
(2) Date: Mar. 13, 2019

(87) PCT Pub. No.: WO2018/064123
PCT Pub. Date: Apr. 5, 2018

(65) Prior Publication Data
US 2019/0218354 A1 Jul. 18, 2019

Related U.S. Application Data

(60) Provisional application No. 62/401,356, filed on Sep. 29, 2016.

(51) Int. Cl.
*B32B 27/08* (2006.01)
*B32B 27/32* (2006.01)
(Continued)

(52) U.S. Cl.
CPC .............. *B32B 27/08* (2013.01); *B32B 27/32* (2013.01); *B32B 27/34* (2013.01); *B32B 27/36* (2013.01);
(Continued)

(58) Field of Classification Search
CPC ......... B32B 27/08; B32B 27/32; B32B 27/34; B32B 27/36; C09D 175/00; C09D 175/04;
(Continued)

(56) References Cited

U.S. PATENT DOCUMENTS

| 6,010,783 A | 1/2000 | Tung |
| 6,294,267 B1 | 9/2001 | Benoit |

(Continued)

FOREIGN PATENT DOCUMENTS

| CA | 0969820 | 6/1975 |
| CA | 1224616 | 7/1987 |

(Continued)

OTHER PUBLICATIONS

PCT/US2017/053637, International Search Report and Written Opinion dated Dec. 5, 2017.
(Continued)

*Primary Examiner* — Zachary M Davis (57) ABSTRACT

The present invention provides coated films and packages formed from such films. In one aspect, a coated film comprises (a) a multilayer polymeric film having opposing facial surfaces, wherein a first facial surface has a root mean square surface roughness of at least 80 nm when measured using image analysis with an atomic force microscope and
(Continued)

wherein a second facial surface has a root mean square surface roughness of less than 80 nm when measured using image analysis with an atomic force microscope; and (b) a coating on at least a portion of the first facial surface, wherein the coating comprises polyurethane, wherein the film comprises at least one of polyethylene, polypropylene, polyethylene terephthalate, or polyamide, and wherein the coated film has a Zebedee clarity of at least 2% when measured according to ASTM D1746/15 in the coated portion of the first facial surface.

13 Claims, 1 Drawing Sheet

(51) Int. Cl.
| | |
|---|---|
| *C08J 7/04* | (2020.01) |
| *C08J 7/043* | (2020.01) |
| *B32B 27/34* | (2006.01) |
| *B32B 27/36* | (2006.01) |

(52) U.S. Cl.
CPC .............. *C08J 7/043* (2020.01); *C08J 7/0427* (2020.01); *B32B 2255/10* (2013.01); *B32B 2255/26* (2013.01); *B32B 2307/406* (2013.01); *B32B 2307/538* (2013.01); *C08J 2323/04* (2013.01); *C08J 2323/06* (2013.01); *C08J 2323/12* (2013.01); *C08J 2367/02* (2013.01); *C08J 2377/00* (2013.01); *C08J 2475/04* (2013.01); *C08J 2475/06* (2013.01); *C08J 2475/08* (2013.01)

(58) Field of Classification Search
CPC .. C09D 175/06; C09D 175/08; C09D 175/10; C09D 175/12; C09D 175/14; C09D 175/16
See application file for complete search history.

(56) References Cited

U.S. PATENT DOCUMENTS

| | | | |
|---|---|---|---|
| 6,528,127 | B1 | 3/2003 | Edlein et al. |
| 7,063,882 | B2 | 6/2006 | Mossbrook et al. |
| 8,653,174 | B2 | 2/2014 | Anderson et al. |
| 9,878,523 | B2 | 1/2018 | Uto et al. |
| 2004/0062919 | A1 | 4/2004 | Kuchenmeister et al. |
| 2004/0115457 | A1* | 6/2004 | Kong ..................... B32B 27/08 |
| | | | 428/515 |
| 2010/0035050 | A1 | 2/2010 | Okawara et al. |
| 2013/0288032 | A1 | 10/2013 | Mazzola et al. |
| 2013/0316138 | A1 | 11/2013 | Ikenaga et al. |
| 2015/0166828 | A1 | 6/2015 | Anderson et al. |
| 2018/0079880 | A1 | 3/2018 | Miyake et al. |
| 2018/0186947 | A1 | 7/2018 | Rosa et al. |

FOREIGN PATENT DOCUMENTS

| | | |
|---|---|---|
| EP | 1004608 | 5/2000 |
| EP | 1229090 | 8/2002 |
| EP | 2730403 | 5/2014 |
| IN | 201303634 | 2/2014 |
| JP | 2005082671 | 3/2005 |
| WO | 2003/066761 | 8/2003 |
| WO | 2010/091346 | 8/2010 |
| WO | 2016/100052 | 6/2016 |
| WO | 2016/196168 | 12/2016 |

OTHER PUBLICATIONS

PCT/US2017/053637, International Preliminary Report on Patentability dated Apr. 2, 2019.

Mira-Glos™ and Mor-Gloss™ UV Curable Coatings, EB Curable Coatings, Solvent-Based Two Component Polyurethane Coatings, or Waterborne Acrylic Coatings, 2014, The Dow Chemical Company, pp. 1-7.

* cited by examiner

COATED FILMS AND ARTICLES FORMED FROM SAME

FIELD

The present invention relates to coated films that can be used in articles such as packages. Such coated films can be particularly useful in packages where a transparent window is desired.

INTRODUCTION

For years, many types of flexible packaging created to protect food, liquids, personal care, and other products have been manufactured with a film structure that typically combines several materials such as polyester, polypropylene, and polyethylene. An adhesive is often used to make a laminate from such layers.

Many flexible packages include one or more transparent windows in order to exhibit the product contained by the package and/or attract the attention of potential consumers. The transparency of common packaging materials such as polyethylene depends on properties such as crystallinity. In general, an improvement in transparency will lead to a decrease in rigidity which can reduce opportunities for downgauging.

It would thus be desirable to have new films and related materials for use in packages that provide improved transparency in locations desired while also providing other benefits.

SUMMARY

The present disclosure provides coated films that advantageously combine polymer-based films with a polyurethane coating that advantageously provide desirable properties such as transparency. In some embodiments, the present disclosure provides polyethylene-based flexible packages with improved transparency. In some embodiments, the present disclosure provides polyethylene-based flexible packages that incorporate one or more transparent windows. The present disclosure, in some embodiments, provides films and packages that are easily recyclable due to the use of compatible materials.

In one embodiment, the present invention provides a coated film that comprises (a) a multilayer polymeric film having opposing facial surfaces, wherein a first facial surface has a root mean square surface roughness of at least 80 nm when measured using image analysis with an atomic force microscope and wherein a second facial surface has a root mean square surface roughness of less than 80 nm when measured using image analysis with an atomic force microscope and (b) a coating on at least a portion of the first facial surface, wherein the coating comprises polyurethane, wherein the film comprises at least one of polyethylene, polypropylene, polyethylene terephthalate, or polyamide, and wherein the coated film has a Zebedee clarity of at least 2% when measured according to ASTM D1746/15 in the coated portion of the first facial surface.

In another embodiment, the present invention provides a coated film that comprises (a) a multilayer polyethylene film having opposing facial surfaces, wherein a first facial surface has a root mean square surface roughness of at least 80 nm when measured using image analysis with an atomic force microscope, and (b) a coating on at least a portion of the first facial surface, wherein the coating comprises polyurethane, wherein the coated film has a total haze of less than 20% when measured according to ASTM D1003 in the coated portion of the first facial surface.

Embodiments of the present invention also provide articles (e.g., flexible packages, pouches, stand-up pouches, bags, etc.) formed from the coated films disclosed herein.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

"Polypropylene" shall mean polymers comprising greater than 50% by weight of units which have been derived from propylene monomer. This includes polypropylene homopolymers or copolymers (meaning units derived from two or more comonomers). Common forms of polypropylene known in the art include homopolymer polypropylene (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include, but are not limited to, Low Density Polyethylene (LDPE); Linear Low Density Polyethylene (LLDPE); Ultra Low Density Polyethylene (ULDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

In one embodiment, the present invention relates to a coated film that comprises (a) a multilayer polymeric film having opposing facial surfaces, wherein a first facial surface has a root mean square surface roughness of at least 80 nm when measured using image analysis with an atomic force microscope and wherein a second facial surface has a root mean square surface roughness of less than 80 nm when measured using image analysis with an atomic force microscope and (b) a coating on at least a portion of the first facial surface, wherein the coating comprises polyurethane, wherein the film comprises at least one of polyethylene, polypropylene, polyethylene terephthalate, or polyamide, and wherein the coated film has a Zebedee clarity of at least 2% when measured according to ASTM D1746/15 in the coated portion of the first facial surface. In some embodiments, a second facial surface of a coated film has a root mean square surface roughness of 40 nm or less when measured using image analysis with an atomic force microscope.

In another embodiment, the present invention relates to a coated film that comprises (a) a multilayer polyethylene film having opposing facial surfaces, wherein a first facial surface has a root mean square surface roughness of at least 80 nm when measured using image analysis with an atomic force microscope, and (b) a coating on at least a portion of the first facial surface, wherein the coating comprises polyurethane, wherein the coated film has a total haze of less than 20% when measured according to ASTM D1003 in the coated portion of the first facial surface. In some embodiments, a second facial surface of a coated film has a root mean square surface roughness of 40 nm or less when measured using image analysis with an atomic force microscope.

Information regarding measurement of root mean square roughness, as that term is used herein, is provided in the Test Methods section below.

In some embodiments, a layer of the film forming the first facial surface comprises a high density polyethylene having a melt index ($I_2$) of 1.0 g/10 minutes or less.

In some embodiments, the polyurethane is formed from (a) a hydroxyl terminated polyol or urethane; and (b) an isocyanate-functional prepolymer. In some such embodiments, the isocyanate-functional prepolymer comprises an aromatic isocyanate. The isocyanate-functional prepolymer, in some such embodiments, comprises an aliphatic isocyanate. In some embodiments, the hydroxyl terminated urethane comprises at least one of a hydroxyl terminated polyether-based urethane, a hydroxyl terminated polyester-based urethane, and a hydroxyl terminated polyester-polyether-based urethane. Additional details regarding the polyurethane that can be used in the coating in various embodiments of the present invention are provided herein.

The multilayer film used in the coated film is non-pigmented in some embodiments.

In some embodiments, the amount of coating on the first facial surface of the film is 0.1 to 7.0 g/m².

In some embodiments, the coating is on less than 50% of the first facial surface based on the surface area of the first facial surface, and the coated film exhibits a gloss of less than 28 gloss units in the region of the first facial surface where the coating is absent when measured according to ASTM D2457.

Embodiments of the present invention also provide articles formed from any of the coated films described herein. In some such embodiments, the coated film has a thickness of 20 to 250 microns. Examples of such articles can include flexible packages, pouches, stand-up pouches, bags, and pre-made packages or pouches. In some embodiments, coated films of the present invention can be used in form, fill and seal processes to make packages, pouches, or other articles.

Multilayer Polymeric Film

The coated films comprise a multilayer polymeric film having opposing facial surfaces. A first facial surface has a root mean square surface roughness of at least 80 nm when measured using image analysis with an atomic force microscope. A second facial surface has a root mean square surface of less than 80 nm when measured using image analysis with an atomic force microscope.

A first layer of the multilayer film provides the surface roughness of the first facial surface, and a second layer provides the multilayer film provides the surface roughness of the second facial surface.

The surface roughness of the first facial surface facilitates the provision of transparency to at least a portion of the film when coated with certain coatings according to some embodiments. A first facial surface has a root mean square surface roughness of at least 80 nm when measured using image analysis with an atomic force microscope. In some embodiments, the first facial surface has a root mean square surface roughness of up to 350 nm when measured using image analysis with an atomic force microscope. A variety of polymers can be used to form the first layer which provides the first facial surface having a root mean square surface roughness of at least 80 nm. For example, in various embodiments, the first layer can be formed from polyethylene, polypropylene, polyethylene terephthalate, or polyamide so long as such layer has the specified surface roughness. In some embodiments where the first layer is formed from polypropylene, the film can be a biaxially oriented matte polypropylene film. In some embodiments where the first layer is formed from polyethylene terephthalate, the film can be a matte polyethylene terephthalate film.

First layers formed from polyethylene are particularly well-suited for multilayer films used in some embodiments of the present invention. In some embodiments, the first layer comprises a high density polyethylene having a melt index ($I_2$) of 1.0 g/10 minutes or less. The high density polyethylene may be a conventional high density polyethylene (HDPE), a high density and high molecular weight polyethylene (HDPE-HMW), or a high density and ultrahigh molecular weight polyethylene (HDPE-UHMW).

The high density polyethylene may have a density of at least 0.935 g/cm³. Moreover, in various embodiments, the high density polyethylene may include a density of 0.935 g/cm³ to 0.975 g/cm³, or 0.935 g/cm³ to 0.965 g/cm³, or 0.935 g/cm³ to 0.960 g/cm³, or 0.935 g/cm³ to 0.955 g/cm³.

As stated above, the high density polyethylene may also have a melt index ($I_2$) of 1.0 g/10 minutes or less when measured according to ASTM D1238 at 190° C. and 2.16 kg load. In some embodiments, the high density polyethylene has a melt index ($I_2$) of 0.5 g/10 minutes or less. In some embodiments, the high density polyethylene has a melt index ($I_2$) of 0.1 g/10 minutes or less. In further embodiments, the high density polyethylene may have an $I_2$ value of 0.001 g/10 minutes to 1.0 g/10 minutes, or 0.001 g/10 minutes to 0.5 g/10 minutes, or 0.001 g/10 minutes to 0.1 g/10 minutes, or 0.01 g/10 minutes to 0.5 g/10 minutes, or 0.01 g/10 minutes to 0.1 g/10 minutes. In some embodiments such as where a UHMW-HDPE is used, the melt index ($I_2$) can be as low as 0.08 g/10 minutes or less.

A number of commercially available high density polyethylenes can be used in the first layer including, for example, DOW™ DGDC-2100 NT 7, which is a high molecular weight high density polyethylene (HMW-HDPE); UNIVAL™ DMDA-6200 NT 7; UNIVAL™ DMDA-6400 NT 7; CONTINUUM™ DGDA-2490 NT; CONTINUUM™ DGDD-2480 NT; DOWLEX™ 2050B; DOW™ MDPE NG6995, which while also referred to as a medium density polyethylene, has a density of 0.939 g/cm³; ELITE™ 5960G and ELITE™ 5960G1, which are enhanced polyethylenes having a density of 0.962 g/cm³. Each of these resins is commercially available from The Dow Chemical Company. Another example of a commercially available high molecular weigh high density polyethylene that can be used in the first layer is BF4810 high density polyethylene from Braskem.

In some embodiments, the high density polyethylene is the only polyethylene in the first layer. In other embodiments, one or more additional polyethylenes can be included to provide a blend of polyethylenes in the first layer. In embodiments where the first layer comprises a blend of polyethylenes, the first layer may include greater than 50% by weight of the high density polyethylene, or greater than 55% by weight of the high density polyethylene, or greater than 60% by weight of the high density polyethylene, or greater than 65% by weight of the high density polyethylene. In some embodiments, the first layer may include about 51% to about 90% by weight of the high density polyethylene, or about 55% to about 80% by weight of the high density polyethylene, or about 65% to about 75% by weight of the high density polyethylene.

For ease of reference, when a blend of polyethylenes are used in the first layer, the high density polyethylene will be referred to as the "first polyethylene" and additional polyethylenes will be referred to as "second polyethylene," "third polyethylene," etc. A variety of polyethylenes can be combined with the high density polyethylene having the melt index ($I_2$) of 1.0 g/10 minutes or less to provide a facial surface of the first layer (and the multilayer film) having a root mean square surface roughness of at least 80 nm.

The second polyethylene can comprise one or more other polyethylenes including, for example, a second high density polyethylene, low density polyethylene (LDPE), linear low density polyethylene (LLDPE), medium density polyethylene (MDPE), very low density polyethylene (VLDPE), and ultra low density polyethylene (ULDPE), or mixtures thereof. In one exemplary embodiment, the second polyethylene comprises a LLDPE.

The second polyethylene may have a melt index ($I_2$) of 20 g/10 minutes or less when measured according to ASTM D1238 at 190° C. and 2.16 kg load. In further embodiments, the second polyethylene may have a melt index ($I_2$) of 0.5 g/10 minutes to 20 g/10 minutes, or 0.75 g/10 minutes to 10 g/10 minutes, or 0.75 g/10 minutes to 5 g/10 minutes, or 0.75 g/10 minutes to 2 g/10 minutes.

In some embodiments, the second polyethylene is a linear low density polyethylene having a melt index of 0.5 to 1.5 g/10 minutes. Examples of such linear low density polyethylenes include DOWLEX™ 2645G and DOWLEX™ 2045.01G, each of which are commercially available from The Dow Chemical Company.

Additionally, various amounts of the second polyethylene are contemplated within the polyethylene blend in the first layer. For example and not by way of limitation, the polyethylene blend in the first layer may include less than 50% by weight of the second polyethylene, or less than 45% by weight of the second polyethylene, or less than 40% by weight of the second polyethylene, or less than 35% by weight of the second polyethylene. Moreover, the polyethylene blend in the first layer may include 10% to 49% by weight of the second polyethylene, or 20% to 40% by weight of the second polyethylene, or 25% to about % by weight of the second polyethylene.

In the first layer of the multilayer film, the first layer may comprise at least about 80% by weight polyethylene, or at least about 90% by weight polyethylene. Stated another way, the total weight percent of the high density polyethylene, the second polyethylene, and optionally any additional polyethylenes may be present in at least about 80% by weight of the first layer, or at least about 90% by weight of the first layer, or at least 95% by weight of the first layer, or at least 99% by weight of the first layer.

Turning now to the second facial surface of the multilayer film, a second layer of the multilayer film provides the second facial surface. In some embodiments, the second facial surface has a root mean square surface roughness of less than 80 nm when measured using image analysis with an atomic force microscope. The second facial surface, in some embodiments has a root mean square surface roughness of 40 nm or less when measured using image analysis with an atomic force microscope.

When the second facial surface has a root mean square surface roughness of less than 80 nm, or less than 40 nm, an improvement in transparency and related optical properties is believed to be achieved when the first facial surface is coated with certain coatings.

A variety of polymers can be used to form the second layer which provides the second facial surface having a root mean square surface roughness of less than 80 nm or less than 40 nm. If the first layer is formed from polyethylene, it may be desirable to also form the second layer from polyethylene. In some embodiments, the second layer is a sealant layer. Any number of polyethylene known to those of skill in the art can be selected to provide the desired surface roughness of the second facial surface. In some embodiments, a second layer comprising only a low density polyethylene (for example, a LDPE having a density of 0.922 g/cm$^3$ and an I$_2$ of 2 g/10 minutes or a LDPE having a density of 0.924 g/cm$^3$ and an I$_2$ of 2 g/10 minutes) can provide the target root mean square surface roughness. A second layer comprising only a linear low density polyethylene (for example, a LLDPE having a density of 0.920 g/cm$^3$ and an I$_2$ of 1 g/10 minutes) can provide the target root mean square surface roughness in some embodiments. In some embodiments, a blend of linear low density polyethylene and low density polyethylene in the second layer can provide the target root mean square surface roughness. For example, in some embodiments, the second layer can comprise a blend of 80% linear low density polyethylene having a density of 0.920 g/cm$^3$ and an I$_2$ of 1 g/10 minutes and 20% low density polyethylene having a density of 0.922 g/cm$^3$ and an I$_2$ of 2 g/10 minutes. In some embodiments, a polyolefin plastomer (for example, a polyolefin plastomer having a density of 0.909 g/cm$^3$ and an I$_2$ of 1 g/10 minutes) in the second layer can provide the target root mean square surface roughness.

In some embodiments, a multilayer film that can be used in coated films of the present invention can comprise 3 or more layers. A multilayer film that can be used in coated films of the present invention can comprise up to 7 layers in some embodiments. The number of layers in the film can depend on a number of factors including, for example, the desired thickness of the multilayer film, the desired properties of the multilayer film, the intended use of the multilayer film, and other factors.

Similarly, various layer structures are contemplated based on the article or application, which utilizes the multilayer film. For example, the multilayer film may include a plurality of layers, wherein other layers have the same composition as the second layer as described above. In this embodiment, it is contemplated that the plurality of polyethylene layers may be the same or may vary in composition and weight ratio between respective layers.

In other embodiments, the multilayer films may have a hybrid structure wherein one or more of the core or inner layers (i.e., non-outer layers) do not have the same composition as the first layer or the second layer described above. For example, the one or more inner or core layers may include polyolefins, polyamides, ethylene vinyl alcohol, ethylene vinyl acetate, ethylene acrylic acid, ethylene maleic anhydride, or combinations thereof. In an exemplary embodiment, the multilayer films may include one inner layer comprising one or more polyolefins, and a second inner layer comprising a second polyolefin, a polyamide, ethylene vinyl alcohol, ethylene vinyl acetate, ethylene acrylic acid, ethylene maleic anhydride, or combinations thereof. Depending on the application, other components are contemplated for the internal layers (e.g., core or inner layers), such as adhesives, tie layers, barrier layers, printings, or other components may be used.

In addition, the present monolayer or multilayer films may also be laminated or bonded to other substrates to provide different features needed for the flexible packages. For example and not by way of limitation, the present monolayer or multilayer films may be laminated to another polyethylene film for sealing. Moreover, the present monolayer or multilayer films may be coextruded with polyamide or ethylene vinyl alcohol (EVOH) to produce a barrier film.

In some embodiments, at least a portion of the film may be non-printed. The entire multilayer film may be non-printed in some embodiments. In such embodiments, the non-printed portions of the film can provide transparency when coated with the coating. Any printed portions can be used for color or other package information. The inclusion of non-printed portions amongst printed portions can, for example, provide transparent windows in the package in some embodiments.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

The multilayer film can have a variety of thicknesses depending, for example, on the desired application or other factors known to those of skill in the art. In one embodiment, the multilayer film has a thickness between 15 and 300 microns.

The multilayer films described herein can be coextruded as blown films or cast films using techniques known to those of skill in the art based on the teachings herein. In particular, based on the compositions of the different film layers disclosed herein, blown film manufacturing lines and cast film manufacturing lines can be configured to coextrude multilayer films of the present invention in a single extrusion step using techniques known to those of skill in the art based on the teachings herein. It is preferred that the films used in embodiments of the present invention be formed in a blown film or cast film process as is generally known in the art, although other methods such as lamination can be used.

Polyurethane Coating

The present invention provides a polyurethane-based coating on the facial surface of the multilayer film (the outer facial surface of the first layer discussed above) having a root mean square surface roughness of at least 80 nm when measured using image analysis with an atomic force microscope.

The term "polyurethane-based coating" is used to indicate that upon curing, the coating comprises primarily polyurethane but that the coating may also include, in some embodiments, unreacted reactants (e.g., polyols, isocyanates, etc.) as well as other additives.

In some embodiments, the polyurethane is formed from: (a) a hydroxyl terminated polyol or urethane; and (b) an isocyanate-functional prepolymer. The isocyanate-functional prepolymer, in some embodiments, comprises an aromatic isocyanate. Examples of aromatic isocyanates that can be used in some embodiments of the present invention include any or all isomers of toluene diisocyanate (TDI) and/or any or all isomers of methylene diphenyl diisocyanate (MDI). In some embodiments, the isocyanate-functional prepolymer comprises an aliphatic isocyanate. Examples of aliphatic isocyanates that can be used in some embodiments of the present invention include any and all isomers of isophorone diisocyanate (IPDI), any and all isomers of hexamethylene diisocyanate (HDI), any and all isomers of xylylene diisocyanate (XDI), any and all isomers of hydrogenated xylylene diisocyanate (H6XDI), and any and all isomers of meta-tetramethylxylylene diisocyanate (TMXDI). The hydroxyl terminated urethane comprises at least one of a hydroxyl terminated polyether-based urethane, a hydroxyl terminated polyester-based urethane, and a hydroxyl terminated polyester-polyether-based urethane, in some embodiments.

The polyurethane may be formed by mixing together two separate components at a prescribed mixing ratio and then curing upon reaction between the two components. In some embodiments, the two reactant components can be prepared so as to provide a mixing ratio of 1:1 (ratio of hydroxyl terminated polyol or urethane to isocyanate-functional prepolymer) to facilitate measuring and mixing. In some embodiments, such mixing ratio can be in the range from 1:0.2 to 1:2. At such mixing ratios, in some embodiments, the isocyanate index is in the range from ~1:1 to ~3:3. In some embodiments, the polyurethane may be a one-component isocyanate terminated prepolymer that reacts with ambient moisture or humidity to complete its cure.

The polyurethane components may be comprised of polyether polyols, polyester polyols, or a combination of both. Such polyols can be linear or branched in some embodiments. Polyesters with aromatic components can be used to impart alternative performance properties such as chemical or heat resistance for a targeted application in some embodiments. In some embodiments, the coating is formed from polyols having molecular weights between 100 and 4700 Daltons and using multifunctional reagents that impart branching such as triisopropanolamine and trimethylolpropane. Such selected materials, when reacted together and combined with certain non-reactive additives, can advantageously provide desirable heat resistance, anti-blocking character, targeted coefficient of friction, and targeted gloss levels to coated films in accordance with some embodiments of the present invention.

The coating can be applied to the outer surface of the film using a variety of techniques by which coatings are typically applied to films including, but not limited to, for example, gravure coating and flexographic coating. Other thin coating techniques may also be used. Persons of skill in the art with equipment to apply solvent-based and/or water-based coatings and adhesives can readily adapt their process to apply a polyurethane coating to a film to obtain the coated films of the present invention. To achieve adequate dynamic viscosity, the target solids at application will depend on the particular coating, but in some embodiments, can be in range of 15% to 80%.

The amount of coating applied to the film, in some embodiments, can be at least 1 gram per square meter. As used herein, the amount of coating is determined by measuring the difference of the weight of the film before coating and after the coating is applied and dried. In some embodiments, the amount of coating applied to the film is up to 7 grams per square meter. The amount of coating applied to the film, in some embodiments, is 1 to 7 grams per square meter. All individual values and subranges from 0.1 to 7.0 grams per square meter are included herein and disclosed herein; for example, the amount of coating may be from a lower limit of 0.1, 0.2, 0.3, 0.4, 0.5, 0.6, 0.7, 0.8, 0.9, 1.0, 2.0, 3.0, 4.0, 5.0, or 6.0 grams per square meter to an upper limit of 0.5, 1.0, 2.0, 3.0, 4.0, 5.0, 6.0, or 7.0 grams per square meter. For example, the amount of coating can be from 3 to 5 grams per square meter in some embodiments.

In some embodiments, the coating may only be applied to a portion of the outer surface of the film. This advantageously provides for various combinations of optical patterns. The ability to provide different optical patterns or properties in different regions of the coated films provides opportunities for creative packaging when the coated films are formed into packages or other articles. In the context of a package, for example, it may be desirable to provide a transparent window to allow a consumer or potential purchaser to view the contents of the package. In such embodiments, the coating may only be applied to the portion of the film that will correspond to the window.

In various embodiments, the coated films can have regions that are opaque (uncoated regions) and one or more regions that have high transparency (coated regions). As another example, the coated films can have regions that have a matte (very low gloss) finish (uncoated regions) and one or more regions that have high gloss (coated regions).

In such embodiments, the polyurethane coating can be applied only to a certain region, or certain regions, of the first facial surface using techniques known to those of skill in the art. For example, a matte finish on the first facial surface of the multilayer film can be obtained upon extrusion due to the use of a resin or blend of resins that provide a high root mean square surface roughness of that surface. The multilayer film can then be reverse printed, and optionally laminated. The polyurethane coating can then be applied on the first facial surface at registry to provide clear windows where desired.

Various embodiments of coated films of the present invention can have one or more desirable properties. Coated films, in some embodiments, can provide improved transparency in regions where the polyurethane coating is applied to the multilayer film. Such transparency can be exhibited by Zebedee clarity and/or total haze values.

In some embodiments, coated films of the present invention have a Zebedee clarity of at least 2% when measured according to ASTM D1746/15 in the coated portion of the first facial surface. Coated films of the present invention, in some embodiments, have a Zebedee clarity of at least 4% when measured according to ASTM D1746/15 in the coated portion of the first facial surface.

In some embodiments, coated films of the present invention have a clarity of at least 65 when measured according to ASTM D1746 in the coated portion of the first facial surface. Coated films of the present invention, in some embodiments, have a clarity of at least 85 when measured according to ASTM D1746 in the coated portion of the first facial surface.

In some embodiments, coated films of the present invention have a total haze of less than 20% when measured according to ASTM D1003 in the coated portion of the first facial surface. Coated films of the present invention, in some embodiments, have a total haze of less than 15% when measured according to ASTM D1003 in the coated portion of the first facial surface. In some embodiments, coated films of the present invention have a total haze of less than 10% when measured according to ASTM D1003 in the coated portion of the first facial surface.

In some embodiments, coated films of the present invention have a Zebedee clarity of at least 2% when measured according to ASTM D1746/15 in the coated portion of the first facial surface and a total haze of less than 20% when measured according to ASTM D1003 in the coated portion of the first facial surface.

In some embodiments wherein the coating is on less than 50% of the first facial surface based on the surface area of the first facial surface of the multilayer film, the coated film exhibits a gloss of less than 28 gloss units in the region of the first facial surface where the coating is absent when measured according to ASTM D2457 at 45°. In some embodiments wherein the coating is on less than 50% of the first facial surface based on the surface area of the first facial surface of the multilayer film, the coated film exhibits a gloss of less than 18 gloss units in the region of the first facial surface where the coating is absent when measured according to ASTM D2457 at 45°. In some embodiments wherein the coating is on less than 50% of the first facial surface based on the surface area of the first facial surface of the multilayer film, the coated film exhibits a gloss of less than 13 gloss units in the region of the first facial surface where the coating is absent when measured according to ASTM D2457 at 45°.

In some embodiments wherein the multilayer film is a polyethylene film, the coated film can advantageously be recyclable in current flexible polyethylene systems.

In some embodiments, coated films of the present invention have a broad thermal resistance range. Coated films, according to some embodiments of the present invention, are thermally resistant over a range of temperatures from 80° C. to 200° C. As used herein, the lower temperature of the range of thermal resistance is the temperature at which the coated film exhibits a heat seal strength of at least 1 lb$_f$/in when measured according to ASTM 1921-98. As used herein, the upper temperature of the range of thermal resistance is the temperature at which the coated film exhibits burn through such that the heat seal strength cannot be measured according to ASTM 1921-98 due to deformation in the coated film.

Embodiments of the present invention also relate to articles formed from any of the coated films disclosed herein. In some embodiments, the article is a flexible package. In some embodiments, the flexible package comprises a first coated film according to the present invention and a second coated film according to the present invention. In some embodiments, the flexible package comprises a first coated film according to the present invention, a second coated film according to the present invention, and a third or more coated films according to the present invention. In some embodiments, the first coated film according to the present invention is heat sealed using the sealable side to another heat sealable surface, whether a film or a sheet or a formed container of any suitable construction that may or may not have a coating of the present invention on the non-heat sealable side of the film or sheet or formed container. Alternatively, the flexible package can be formed from a single coated film of the present invention that is folded.

In some embodiments, the flexible package is in the form of one or more of the following: a pouch, a pillow pouch, a bag, a sachet, a flow wrap, a heavy duty shipping sack, or a stand up pouch that is formed using techniques known to those of skill in the art based on the disclosure herein.

The thickness of the coated film used to form the flexible package can be selected depending on a number of factors including, for example, the size of the flexible package, the volume of the flexible package, the contents of the flexible package, the desired properties of the flexible package, and other factors. In some such embodiments, the coated film has a thickness used in a flexible package of the present invention has a thickness of 15 to 400 microns. All individual values and subranges from 15 to 300 microns are included herein and disclosed herein; for example, the thickness of the coated film may be from a lower limit of 20, 30, 40, 50, 60, 70, 80, 90, 100, 110, 120, 130, 140, 150, 160, 170, 180, or 190 microns to an upper limit of 30, 40, 50, 60, 70, 80, 90, 100, 110, 120, 130, 140, 150, 160, 170, 180, 190, 200, 220, 250, 280, or 300 microns.

Non-limiting examples of contents suitable for containment by flexible packages of the present invention include comestibles (beverages, soups, cheeses, cereals), liquids, shampoos, oils, waxes, emollients, lotions, moisturizers, medicaments, pastes, surfactants, gels, adhesives, suspensions, solutions, enzymes, soaps, cosmetics, liniments, flowable particulates, and combinations thereof.

Test Methods

Unless otherwise indicated herein, the following analytical methods are used in the describing aspects of the present invention:

Melt index: Melt indices $I_2$ (or 12) and $I_{10}$ (or I10) are measured in accordance to ASTM D-1238 at 190° C. and at 2.16 kg and 10 kg load, respectively. Their values are reported in g/10 min. "Melt flow rate" is used for polypropylene based resins, and other resins, and determined according to ASTM D1238 (230° C. at 2.16 kg).

Density: Samples for density measurement are prepared according to ASTM D4703. Measurements are made, according to ASTM D792, Method B, within one hour of sample pressing.

Gloss is determined according to ASTM D2457.

Clarity is determined according to ASTM D1746.

Zebedee clarity is determined according to ASTM D1746/15.

Haze and internal haze are measured according to D1003.

Surface Roughness

The surface roughness of various film surfaces disclosed herein are characterized based on root mean square surface roughness when measured using image analysis with an atomic force microscope. As used herein, the root mean square surface roughness of a surface is measured using image analysis with an atomic force microscope as follows.

The instrument parameters are:

1) A Brüker Dimension ICON atomic force microscope (AFM) using a Nanoscope V controller operating Nanoscope v8.15 operating software is operated in tapping mode. Phase detection channel is on as a qualitative barometer of tracking quality.

2) A 90 µm² scan size is chosen to generate roughness data as a reasonable combination of area size, acquisition time, and feature resolution.

3) The scan rate is set to 0.250 Hz.

4) Images consist of 512×512 pixels.

5) Engagement setting (tapping ratio) is set to 0.90.

6) Target amplitude is set to 1000 mV and allowed to engage automatically.

7) Mikro Masch NSC 16 (without Al backside coating) probes are used for all scans. The cantilevers have a typical resonance frequency of about 190 kHz and a typical spring constant of about 40 N/m.

The image analysis parameters are:

1) Image Metrology SPIP v6 is used to calculate roughness data from the 90 µm² topography images.

2) To remove the effects of non-planar/tilted surfaces, all images are subjected to a flattening routine of: 3rd order global plane fit and a linewise fit of 3.

3) To remove excessive waviness all images are filtered with an L-filter set to relative ⅕th. This is the ISO 16610 Gaussian L-filter according to the ISO 25178-2 standard.

4) Feature exclusion boxes are used to exclude foreign surface debris from the images as necessary.

5) The root mean square roughness value is used as the primary roughness value comparator between the samples. This is an amplitude parameter (symbol Sq) with a 3D reference to ISO 25178-2.

Some embodiments of the invention will now be described in detail in the following Examples.

EXAMPLES

Example 1

Preparation of Reactant Compositions for Polyurethane Coating

The following Examples include a multilayer film coated with a polyurethane coating according to an embodiment of the present invention. The polyurethane coating used in these Examples is prepared from two reactant compositions as follows.

Reactant Composition A comprises a hydroxyl terminated urethane and is prepared from the following ingredients:

| Ingredient | Description | Amount (wt. %) |
|---|---|---|
| ethyl acetate | Solvent from UNIVAR, Inc. | 26.5861 |
| Triisopropylanolamine (TIPA) | TIPA (99%) from The Dow Chemical Company | 20.2901 |
| monomeric toluene diisocyanate (TDI) | Mondur TD-80 Grade B from Bayer Material Science | 17.8299 |
| polyether diol | polyether diol (nominal molecular weight of 425) from The Dow Chemical Company | 13.8618 |
| polyether polyol | VORANOL 220-110N from The Dow Chemical Company | 21.4276 |
| antifoam | SAG-47 from Momentive Performance Materials | 0.0046 |

To prepare Reactant Composition A, the TIPA is melted. The polyether diol (nominal molecular weight of 425) is vacuum loaded into a reactor. The melted TIPA is vacuum loaded into the reactor, followed by the polyether polyol (VORANOL 220-110N). The vacuum lines are rinsed with ethyl acetate and the contents of the reactor are stirred at 75 RPM. Ethyl acetate is vacuum loaded into the reactor. The contents of the reactor are cooled via a cooling jacket. After cooling, the TDI is loaded to the reactor, and the vacuum lines are rinsed with ethyl acetate. Because of the exothermic nature of the reaction, the contents of the reactor are cooled to a temperature of 75° C. The temperature in the reactor is held at 75° C. under agitation for 4 hours. The contents of the reactor are then cooled to 60° C., and the viscosity is measured. If the viscosity is <2500 cP, the contents of the reactor are cooled to 40° C., and 0.393 weight percent TDI (based on the original TDI charge) is added, and the mix tank contents are heated and held at 75° C. for one hour. If the viscosity is >2500 cP, a mixture of the antifoam and the remaining ethyl acetate are vacuum loaded to the reactor. The contents are then stirred for 30 minutes. The reactor is then cooled to 50° C., and the Reactant Composition A is packaged for use.

Reactant Composition B comprises an isocyanate-functional prepolymer and is prepared from the following ingredients:

| Ingredient | Description | Amount (wt. %) |
|---|---|---|
| ethyl acetate | Solvent from UNIVAR, Inc. | 24.049 |
| Trimethylolpropane | Trimethylolpropane from Lanxess Corp. | 11.480 |
| monomeric toluene diisocyanate (TDI) | Mondur TD-80 Grade B from Bayer Material Science | 43.612 |
| Additive | Synaceti 125 from Werner G. Smith, Inc. | 1.191 |
| Lubricant | Refined corn oil from Cargill Inc. | 1.191 |
| cyclohexane | Cyclohexane from UNIVAR, Inc. | 18.423 |
| benzoyl chloride | benzoyl chloride from Aldrich Chemical Co. | 0.055 |

To prepare Reactant Composition B, the Additive and the Lubricant are premixed and held at 50° C. The trimethylolpropane is loaded to the reactor followed by ethyl acetate. The TDI is vacuum loaded to the reactor followed by the remainder of the ethyl acetate as a rinse. The batch is held at 70° C. for 3 hours. The batch is then cooled to 55° C. The viscosity of the batch is measured. If the viscosity is <380 cP, the viscosity of the batch is adjusted to >380 cP by adding trimethylolpropane. If the viscosity is >380 cP, or after the additional trimethylolpropane is added, the reactor is then cooled to 55° C. The premixed Additive/Lubricant are vacuum loaded to the reactor. The cyclohexane is then added to the reactor, and the contents are held at 45° C. and stirred 45 minutes until the contents are clear (e.g., Additive must be dissolved). The benzoyl chloride is then vacuum loaded to the reactor, and the contents are stirred for 15 minutes. Reactant Composition B is then packaged for use.

The foregoing discussion describes the synthesis of two components (Reactant Composition A and Reactant Composition B) that might be provided by a coating supplier and that can be used to form a polyurethane coating for some embodiments of the present invention. As discussed below, Reactant Composition A and Reactant Composition B can be applied to a film and reacted (e.g., by a film converter) to form the polyurethane coating on the film. In general, one part Reactant Composition A is mixed with one part Reactant Composition B. The Compositions are mixed together to ensure homogeneity, and are applied onto a target film at a target coating weight. To achieve adequate dynamic viscosity in these Samples, the target solids at application should be around 30%. According to one of the potential coating techniques, the coating is roll applied, either direct or reverse gravure, with or without a smoothing bar. Solvents are then removed by force dry, or air dry heated oven. The urethane reaction of Reactant Composition A and Reactant Composition B commences upon solvent removal. At a mix ratio of 1:1, the theoretical isocyanate index is ~1.4:1. For purposes of Examples 3-5, a polyurethane coating formed from Reactant Composition A and Reactant Composition B shall be referred to as the "Polyurethane Coating."

Figure 1:
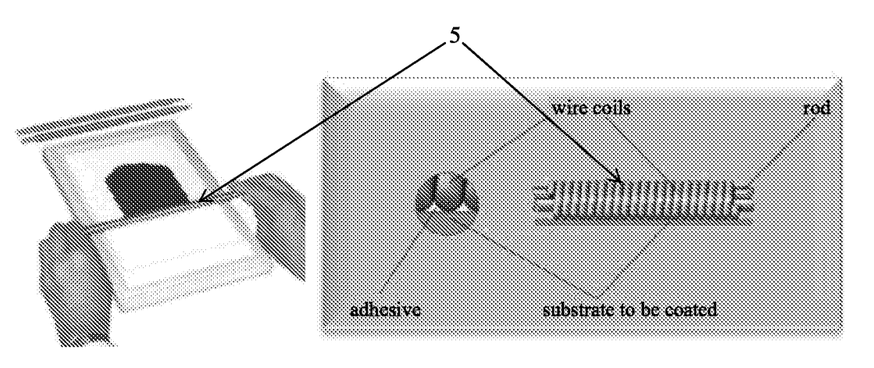
FIG. 1 illustrates the application of a coating to a film.

For Examples 3-5 below, 100 grams of the coating mixture is prepared as follows. 27 grams of Reactant Composition A is mixed with 27 grams of Reactant Composition B and 46 grams of ethyl acetate as a diluent solvent. The mixture is stirred for two minutes to homogenize the mixture. The coating mixture is applied to the polyethylene film from top-to-bottom using a Mayer bar 5 as shown in FIG. 1 in Examples 3-4, and automatically applied to the polyethylene film in Example 5. The coating is then air heated to remove the solvents.

Example 2

Preparation of Additional Reactant Compositions for Polyurethane Coatings

Reactant Composition C comprises a methylene diphenyl diisocyanate (MDI) prepolymer and is prepared from the following ingredients:

| Ingredient | Description | Amount (wt. %) |
| --- | --- | --- |
| ethyl acetate | Solvent from Nexeo, Inc. | 24.049 |
| Trimethylolpropane | Trimethylolpropane from ACROS Organics, Inc. | 6.471 |
| Isonate 125M (MDI) | Methylene diphenyl diisocyanate (MDI) from The Dow Chemical Company | 48.62 |
| Additive | Synaceti 125 from Werner G. Smith, Inc. | 1.191 |
| Lubricant | Refined corn oil from ACH Food Companies, Inc. | 1.191 |
| cyclohexane | Cyclohexane from Fisher Scientific, Inc. | 18.423 |
| benzoyl chloride | Benzoyl chloride from Aldrich Chemical Co. | 0.055 |

To prepare Reactant Composition C, the Additive and the Lubricant are premixed and held at 50° C. The trimethylolpropane is loaded to the reactor followed by ethyl acetate. The MDI is vacuum loaded to the reactor followed by the remainder of the ethyl acetate as a rinse. The batch is held at 70° C. for 3 hours. The batch is then cooled to 55° C. The viscosity of the batch is measured. If the viscosity is <380 cP, the viscosity of the batch is adjusted to >380 cP by adding trimethylolpropane. If the viscosity is >380 cP, or after the additional trimethylolpropane is added, the reactor is then cooled to 55° C. The premixed Additive/Lubricant is vacuum loaded to the reactor. The cyclohexane is then added to the reactor, and the contents are held at 45° C. and stirred 45 minutes until the contents are clear (e.g., Additive must be dissolved). The benzoyl chloride is then vacuum loaded to the reactor, and the contents are stirred for 15 minutes. Reactant Composition B is then packaged for use.

Reactant Composition A (from Example 1) and Reactant Composition C can be applied to a film and reacted (e.g., by a film converter) to form a polyurethane coating on the film. In general, one part Reactant Composition A is mixed with one part Reactant Composition C. The Compositions are mixed together to ensure homogeneity, and are applied onto a target film at a target coating weight. To achieve adequate dynamic viscosity, the target solids at application should be around 30%. According to one of the potential coating techniques, the coating is roll applied, either direct or reverse gravure, with or without a smoothing bar. Solvents are then removed by force dry, or air dry heated oven. The urethane reaction of Reactant Composition A and Reactant Composition C commences upon solvent removal. At a mix ratio of 1:1, the theoretical isocyanate index is ~1.4:1. For purposes of these examples, a polyurethane coating formed from Reactant Composition A and Reactant Composition C shall be referred to as PU Coating 2.

Reactant Composition D comprises an isophorone diisocyanate (IPDI) prepolymer and is prepared from the following ingredients:

| Ingredient | Description | Amount (wt. %) |
| --- | --- | --- |
| ethyl acetate | Solvent from Nexeo, Inc. | 24.049 |
| Trimethylolpropane | Trimethylolpropane from ACROS Organics, Inc. | 8.031 |
| monomeric isophorone diisocyanate (IPDI) | Evonik Industries, Inc. | 47.06 |
| Additive | Synaceti 125 from Werner G. Smith, Inc. | 1.191 |
| Lubricant | Refined corn oil from ACH Food Companies, Inc. | 1.191 |
| cyclohexane | Cyclohexane from UNIVAR, Inc. | 18.423 |
| benzoyl chloride | benzoyl chloride from Aldrich Chemical Co. | 0.055 |

To prepare Reactant Composition D, the Additive and the Lubricant are premixed and held at 50° C. The trimethylolpropane is loaded to the reactor followed by ethyl acetate. The IPDI is vacuum loaded to the reactor followed by the remainder of the ethyl acetate as a rinse. The batch is held at 70° C. for 4 hours. The batch is then cooled to 55° C. The viscosity of the batch is measured. If the viscosity is <380 cP, the viscosity of the batch is adjusted to >380 cP by adding trimethylolpropane. If the viscosity is >380 cP, or after the additional trimethylolpropane is added, the reactor is then cooled to 55° C. The premixed Additive/Lubricant is vacuum loaded to the reactor. The cyclohexane is then added to the reactor, and the contents are held at 45° C. and stirred 45 minutes until the contents are clear (e.g., Additive must be dissolved). The benzoyl chloride is then vacuum loaded to the reactor, and the contents are stirred for 15 minutes. Reactant Composition B is then packaged for use.

Reactant Composition A (from Example 1) and Reactant Composition D can be applied to a film and reacted (e.g., by a film converter) to form a polyurethane coating on the film. In general, one part Reactant Composition A is mixed with one part Reactant Composition D. The Compositions are mixed together to ensure homogeneity, and are applied onto a target film at a target coating weight. To achieve adequate dynamic viscosity, the target solids at application should be around 30%. According to one of the potential coating techniques, the coating is roll applied, either direct or reverse gravure, with or without a smoothing bar. Solvents are then removed by force dry, or air dry heated oven. The urethane reaction of Reactant Composition A and Reactant Composition D commences upon solvent removal. At a mix ratio of 1:1, the theoretical isocyanate index is ~1.4:1. For purposes of these examples, a polyurethane coating formed from Reactant Composition A and Reactant Composition D shall be referred to as PU Coating 3.

Example 3

A three layer film is prepared for evaluation. The film is a coextruded polyethylene film in an A/B/C arrangement with the following composition:

| Layer | Component(s) (Nominal Thickness) | Density (g/cm$^3$) | $I_2$ (g/10 mins) |
|---|---|---|---|
| Top (A) | 60% HDPE 40% LLDPE1 (11 microns) | 0.950 0.9175-0.9215 | 0.07 0.65-0.85 |
| Intermediate (B) | 80% LLDPE2 20% LDPE (33 microns) | 0.922 0.923 | 1.0 1.9 |
| Bottom (C) | 80% LLDPE2 20% LDPE (11 microns) | 0.922 0.923 | 1.0 1.9 |

HDPE is DOW™ HDPE DGDC-2100 NT 7. LLDPE1 is DOWLEX™ 2685G. LLDPE2 is DOWLEX™ 2045.01G. LDPE is DOW™ LDPE 503A. Each of the resins is commercially available from The Dow Chemical Company. The film has a nominal overall thickness of 55 microns.

The coextruded 3-layer film is produced on an Alpine 7-Layer blown film run by using the same polymer feed in two of the 7 layers represented as layers A/A/B/B/B/C/C (as designated in the above table) with the "A" layer (bottom) being in the inside of the bubble. The 5 layer structure is achieved by combining the "B" and "C" layers and the "D" and "e" layers. The individual feed lines are all 50 mm 30:1 L/D grooved feed extruders where each extruder was fed from a 4 component blender. The 7 extruders combined produce a feed to the 75 mm 7-layer flat die (16/16/26/26/16) of 23 kg/hr. The blow up ratio is 2.5:1. The standard frost line height is 30 cm. The film thickness is maintained using an auto profile air ring system and an IBC.

Comparative Film A is the uncoated film described above. Inventive Film 1 is prepared by applying the Polyurethane Coating described above to the top layer (Layer A) of the film sample. For Inventive Film 1, the amount of Polyurethane Coating applied is 0.2 grams per square meter.

Inventive Film 1 is first compared to Comparative Film A by visual inspection. The haze in Inventive Film 1 is improved as objects behind Inventive Film 1 better maintain their intensity and contrast of color than when placed behind Comparative Film A. In addition, Inventive Film 1 exhibited improved clarity as sharper details are observed from a black-and-white image placed approximately 10 cm behind the film as compared to Comparative Film A.

Inventive Film 1 and Comparative Film A are also analyzed under a laser scanning microscope (LSM). The images illustrate that the first facial surface (Layer A) of the uncoated film (Comparative Film A) has a rough surface with many peaks and valleys. In Inventive Film 1, the application of the Polyurethane Coating smooths the surface. According to data obtained from the laser scanning microscope, the roughness is reduced from 1231 nm to 188.76 nm.

Inventive Film 1 and Comparative Film A are also analyzed under an atomic force microscope (AFM). The AFM results also show that the Polyurethane Coating over Layer A in Inventive Film 1 indeed produces a very smooth topography. In particular, when the root mean square surface roughness of the surface layer is measured using the AFM, the root mean square surface roughness decreases from 155.7 nm (for the facial surface of Layer A of Comparative Film A) to 13.2 nm (for the corresponding coated surface in Inventive Film A).

Inventive Films 2 and 3 are also prepared in the same manner as Inventive Film 1, except that the Polyurethane Coating is applied to Inventive Film 2 at 0.5 grams per square meter and to Inventive Film 3 at 1.0 grams per square meter. The LSM and AFM are then used to measure the surface roughnesses of coated Layer in Inventive Films 2 and 3. The results are as follows:

| Sample | Coating Level (gsm) | LSM Root Mean Sq. Surface Roughness (nm) | AFM Root Mean Sq. Surface Roughness (nm) |
|---|---|---|---|
| Comparative Film A | 0 | 1231.0 | 155.7 |
| Inventive Film 1 | 0.2 | 189 | 13.2 |
| Inventive Film 2 | 0.5 | 238 | 24.6 |
| Inventive Film 3 | 1.0 | 314 | 16.5 |

Thus, even a small amount of the Polyurethane Coating (0.2 gsm) can reduce the roughness of the surface of the film significantly.

The total haze, internal haze, gloss at 45°, and Zebedee clarity of the films are also measured. The results are as follows:

| Sample | Coating Level (gsm) | Total Haze (%) | Internal Haze (%) | Gloss, 45° | Zebedee Clarity |
|---|---|---|---|---|---|
| Comparative Film A | 0 | 49 | 8 | 12 | 0.44 |
| Inventive Film 1 | 0.2 | 12 | 8 | 78 | 6.8 |
| Inventive Film 2 | 0.5 | 13 | 7 | 76 | 4.1 |
| Inventive Film 3 | 1.0 | 12 | 9 | 79 | 5.4 |

The total haze changed from 49% to 12% when the Polyurethane Coating is applied surface of Layer A of the film. Further increasing the coating weight did not improve the total haze.

The internal haze data show that application of the Polyurethane Coating reduces the surface haze (the difference between total haze and internal haze) from 41% in Comparative Film A to 4% in Inventive Film 1 when 0.2 gsm of the Polyurethane Coating is applied. This is a 10× reduction in surface haze.

The results of gloss testing show that the gloss (45°) is also improved from 12 units for Comparative Film A to an average of 78 units for the Inventive Films.

The results obtained from the Zebedee clarity test also show a dramatic improvement from 0.44 units for Comparative Film A to an average of 5.4 units for the Inventive Films.

Example 4

Comparative Film B is prepared in the same manner as Comparative Film A above. Comparative Film C is prepared by applying a Comparative Coating to the top layer (Layer A) of Comparative Film B. The Comparative Coating is a polyurethane-based, non-reactive polymer that has a low molecular weight and is diluted in alcohol such that it cures by evaporation. Inventive Film 4 is prepared by applying the Polyurethane Coating described above to the top layer of Comparative Film B. For Comparative Film C and Inventive Film 4, the amount of coating applied is 0.2 grams per square meter.

The total haze, internal haze, gloss at 45°, and clarity of the films are measured. The results are as follows:

| Sample | Coating Level (gsm) | Total Haze (%) | Gloss, 45° | Clarity |
|---|---|---|---|---|
| Comparative Film B | 0 | 49.8 | 12 | 38.8 |
| Comparative Film C | 0.2 | 25.6 | 37 | 61.9 |
| Inventive Film 4 | 0.2 | 13.8 | 74.9 | 84.4 |

Inventive Film 4 exhibits enhanced clarity and lower haze than the uncoated film (Comparative Film B) and the film coated with the Comparative Coating (Comparative Film C). Similar observations are made in a visual comparison of the films as Inventive Film 4 provides better replication of colors and higher definition of contours.

Example 5

A five layer film is prepared for evaluation. The film is a coextruded polyethylene film in an A/B/C/D/E arrangement with the following composition:

| Layer | Component(s) (Nominal Thickness) | Density (g/cm³) | I₂ (g/10 mins) |
|---|---|---|---|
| Top (A) | 100% HDPE2 (10.2 microns) | 0.958-0.965 | 0.7-1.0 |
| Intermediate (B) | 80% LLDPE2 20% HDPE2 (3.4 microns) | 0.922 0.958-0.965 | 1.0 0.7-1.0 |
| Intermediate (C) | 100% HDPE2 (10.2 microns) | 0.958-0.965 | 0.7-1.0 |
| Intermediate (D) | 80% LLDPE2 20% HDPE2 (3.4 microns) | 0.922 0.958-0.965 | 1.0 0.7-1.0 |
| Bottom (E) | Sealant (6.8 microns) | 0.895 | 3.8 |

HDPE2 is a high density polyethylene. LLDPE2 is DOWLEX™ 2045.01G. Sealant is SEALUTION™ 140. DOWLEX™ 2045.01G and SEALUTION™ 140 are commercially available from The Dow Chemical Company. The film has a nominal overall thickness of 34 microns.

The coextruded 5-layer film is produced on an Alpine 7-Layer blown film run by using the same polymer feed in two of the 7 layers represented as layers A/B/C/D/E/F/G (as designated in the above table) with the "A" layer (bottom) being in the inside of the bubble. The 5 layer structure is achieved by combining the "B" and "C" layers and the "D" and "E" layers (A/B/B/C/C/D/E). The individual feed lines are all 50 mm 30:1 L/D grooved feed extruders where each extruder was fed from a 4 component blender. The 7 extruders combined produce a feed to the 75 mm 7-layer flat die (16/16/26/26/16) of 23 kg/hr. The blow up ratio is 2.5:1. The standard frost line height is 30 cm. The film thickness is maintained using an auto profile air ring system and an IBC.

Comparative Film D is the uncoated film described above. Inventive Film 5 is prepared by automatically applying the Polyurethane Coating described above to the top layer (Layer A) of the film sample using a flexographic printing machine (Windmoller & Hoelscher MIRAFLEX 10 color station). For Inventive Film 5, the amount of Polyurethane Coating applied is 1.7 grams per square meter.

The root mean square surface roughness (measured using AFM), total haze and gloss at 60° are measured. The results are as follows:

| Sample | Coating Level (gsm) | AFM Root Mean Sq. Surface Roughness (nm) | Total Haze (%) | Gloss, 60° |
|---|---|---|---|---|
| Comparative Film D | 0 | 86 | 41 | 45 |
| Inventive Film 5 | 1.7 | 21 | 27 | 85 |

Inventive Film 5 exhibits a significant reduction in total haze and an improvement in total gloss as comparted to the uncoated film (Comparative Film D). Similar observations are made in a visual comparison of the films as Inventive Film 5 provides better replication of colors and higher definition of contours.

That which is claimed is:

1. A coated film comprising:
   (a) a multilayer polyethylene film having opposing facial surfaces, wherein a first facial surface has a root mean square surface roughness of at least 80 nm when measured using image analysis with an atomic force microscope; and
   (b) a coating on at least a portion of the first facial surface, wherein the coating comprises polyurethane,
wherein the coated film has a total haze of less than 20% when measured according to ASTM D1003 in the coated portion of the first facial surface.

2. A coated film comprising:
   (a) a multilayer polymeric film having opposing facial surfaces, wherein a first facial surface has a root mean square surface roughness of at least 80 nm when measured using image analysis with an atomic force microscope and wherein a second facial surface has a root mean square surface roughness of less than 80 nm when measured using image analysis with an atomic force microscope; and
   (b) a coating on at least a portion of the first facial surface, wherein the coating comprises polyurethane,
wherein the film comprises at least one of polyethylene, polypropylene, polyethylene terephthalate, or polyamide, and wherein the coated film has a Zebedee clarity of at least 2% when measured according to ASTM D1746/15 in the coated portion of the first facial surface.

3. The coated film of claim 2, wherein a second facial surface has a root mean square surface roughness of 40 nm or less when measured using image analysis with an atomic force microscope.

4. The coated film according to claim 2, wherein a layer of the film forming the first facial surface comprises a high density polyethylene having a melt index ($I_2$) of 1.0 g/10 minutes or less.

5. The coated film according to claim 2, wherein the polyurethane is formed from: (a) a hydroxyl terminated polyol or urethane; and (b) an isocyanate-functional prepolymer.

6. The coated film according to claim 5, wherein the isocyanate-functional prepolymer comprises an aromatic isocyanate.

7. The coated film according to claim 5, wherein the isocyanate-functional prepolymer comprises an aliphatic isocyanate.

8. The coated film according to claim 5, wherein the hydroxyl terminated urethane comprises at least one of a hydroxyl terminated polyether-based urethane, a hydroxyl terminated polyester-based urethane, and a hydroxyl terminated polyester-polyether-based urethane.

9. The coated film according to claim 2, wherein the multilayer film is non-pigmented.

10. The coated film according to claim 2, wherein the amount of coating on the first facial surface of the film is 0.1 to 7.0 g/m$^2$.

11. The coated film according to claim 2, wherein the coating is on less than 50% of the first facial surface based on the surface area of the first facial surface, wherein the coated film exhibits a gloss of less than 28 gloss units in the region of the first facial surface where the coating is absent when measured according to ASTM D2457.

12. An article formed from the coated film according to claim 2.

13. The article of claim 12, wherein the article comprises a package.

* * * * *